United States Patent [19]

Mundy et al.

[11] Patent Number: 4,832,449
[45] Date of Patent: May 23, 1989

[54] OPTICAL PROJECTORS FOR HEAD-UP DISPLAYS

[75] Inventors: Anthony C. Mundy, Cuxton; David G. Steward, Upchurch, both of England

[73] Assignee: GEC-Marconi Limited, England

[21] Appl. No.: 125,486

[22] Filed: Nov. 25, 1987

[30] Foreign Application Priority Data

Nov. 28, 1986 [GB] United Kingdom ............... 8628498

[51] Int. Cl.$^4$ ............................................ G02B 27/14
[52] U.S. Cl. ............................... 350/174; 350/169; 350/286
[58] Field of Search ............. 350/174, 173, 169, 286, 350/287

[56] References Cited

U.S. PATENT DOCUMENTS

| | | | |
|---|---|---|---|
| 1,497,357 | 6/1924 | Comstock | 350/173 |
| 1,862,950 | 6/1932 | Ball | 350/173 |
| 1,910,492 | 5/1933 | Mellor | 350/173 |
| 3,987,299 | 10/1976 | Mulder | 350/173 |
| 4,714,320 | 12/1987 | Banbury | 350/174 |

FOREIGN PATENT DOCUMENTS 0010615 1/1987 Japan .................... 350/169

*Primary Examiner*—John K. Corbin
*Assistant Examiner*—Jay Patrick Ryan
*Attorney, Agent, or Firm*—Kirschstein, Ottinger, Israel & Schiffmiller

[57] ABSTRACT

An optical projector (11) for a two-color head-up display wherein light of a first color from a first data source (15) passes through a first lens arrangement (23) into a first wedge-shaped body (27) wherein the light is, in turn, internally reflected at first and second angled faces (35 and 33) of the body and then exits the body at the first face (35) to pass via a second lens arrangement (25) to the system combiner (13) in a direction at an angle to that which light enters the body, and light of a second color from a second data source (37) passes through a third lens arrangement (41) into a second wedge-shaped body (43) wherein the light is reflected at one (49) of first and second angled faces (47, 49) of the second body and then exits the body at the other angled face (47), which is adjacent the second angled face of the first body, and then passes through the first body to the second lens arrangement, there being a dichroic coating at the interface of the two bodies to effect reflection of light of the first color but allow transmission of light of the second color, and the light paths for light for the two colors being of equal length. The arrangement of the projector facilitates the projector having lateral dimensions dictated by the data sources (e.g. CRTs) rather than the optical elements of the projector.

5 Claims, 1 Drawing Sheet

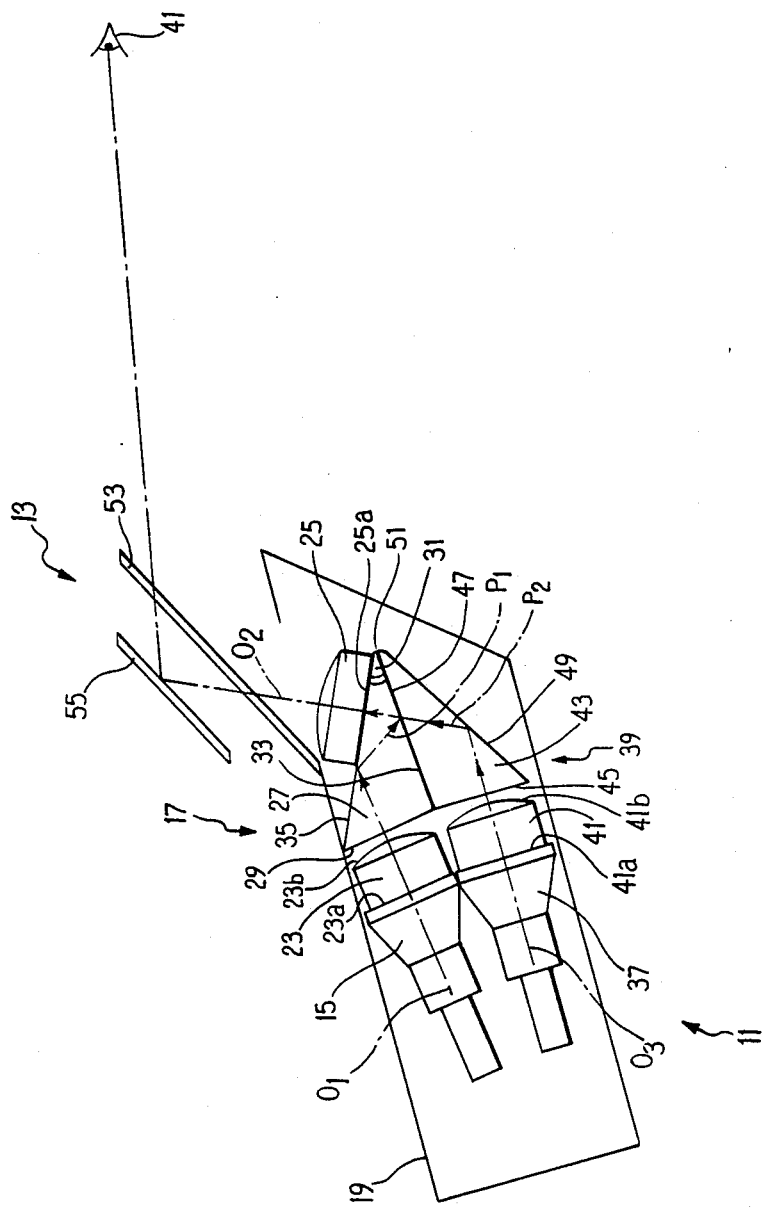

4,832,449

OPTICAL PROJECTORS FOR HEAD-UP DISPLAYS

DISCLOSURE STATEMENT

The applicants are unaware of any disclosure more relevant than U.S. Pat. No. 4,611,877 referred to in the specification of the present application.

BACKGROUND OF THE INVENTION

1. Field of the Invention

More particularly, the invention relates to such optical projectors comprising: a luminous data source and means for projecting and collimating light from the source comprising: a first lens arrangement arranged to receive light from the source; a second lens arrangement having an optical axis inclined with respect to the optical axis of the first lens arrangement; and between the first and second lens arrangements a reflector means for deflecting rays from the first lens arrangement to the second lens arrangement for transmission thereby; said reflector means comprising a body of light refractive material having a light input face via which light enters the body from an output surface of the first lens arrangement and two further faces which define a wedge-shaped portion of the body extending across a light input surface of the second lens arrangement, one of two said further faces having a mirror coating thereon and the wedge angle and orientation of the wedge-shaped portion of the body being such that light entering the body from the first lens arrangement undergoes critical angle reflection at the other of said two further faces to the said one further face from whence, after reflection, it is transmitted, without substantial reflection, by the said other further face to the second lens arrangement for transmission thereby.

2. Description of Related Art

Such an optical projector, hereinafter referred to as an optical projector of the kind specified, forms the subject of U.S. Pat. No. 4,611,877 filed on 30 Aug. 1985 in the name of Stafford Malcolm Ellis.

SUMMARY OF THE INVENTION

It is an object of the present invention to provide an adaptation of an optical projector of the kind specified for use where a two-colour display is required.

According to the present invention there is provided an optical projector of the kind specified further including: a second luminous data source which produces light in a waveband different from that of said first-mentioned source; a third lens arrangement arranged to receive light from said second source; and a second body of light refractive material having a light input face via which light enters said second body from an output surface of the third lens arrangement, and two further faces which define a wedge-shaped portion of said second body; said mirror coating being a dichroic coating at an interface between said first-mentioned body and one of said further faces of said second body and being reflective to light from said first-mentioned source and transmissive to light from said second source; and the arrangement being such that light entering the second body from the second source via said third lens arrangement is first reflected at the other further face of said second body from whence it is transmitted, via said dichroic coating, to said second lens arrangement for transmission thereby, the length of the light path between said first-mentioned source and said second lens arrangement being substantially equal to the length of the light path between said second source and said second lens arrangement.

In a preferred arrangement in accordance with the invention said first-mentioned and second bodies of light refractive material are of substantially identical shape with said interface being between corresponding faces of the two bodies.

In an arrangement according to the invention light from said second source preferably undergoes critical angle reflection at said other further face of said second body. However in other arrangements such reflection may result at least partly from the presence of a mirror coating on said other further face of said second body.

The invention also provides a head-up display head incorporating an optical projector according to the invention.

For the avoidance of doubt it is pointed out that by critical angle reflection is meant reflection at an angle of incidence equal to or greater than the critical angle, i.e. total internal reflection.

BRIEF DESCRIPTION OF THE DRAWING

A head-up display head incorporating an optical projector according to the invention will now be described, by way of example, with reference to the accompanying drawing which is a schematic elevational diagram of the head-up display head.

DETAILED DESCRIPTION OF THE PREFERRED EMBODIMENT

Referring to the drawing, the display head comprises an optical projector 11 and a combiner arrangement 13. The projector 11 comprises a first cathode ray tube (CRT) 15 and associated collimating optical system 17 supported within a housing 19, the CRT 15 producing on its screen a luminous display of a first colour e.g. in a narrow green light waveband. The active optical elements of the collimating system 17 comprise two serially spaced apart lens clusters 23 and 25. The first lens cluster 23 has an input surface 23a closely adjacent to the screen of the CRT 15. The optical axis $O_2$ of the second lens cluster 25 is inclined at an angle of about 60° to the optical axis $O_1$ of the first lens cluster 23.

In the space between the two lens clusters 23, 25 there is a reflector means in the form of a wedge-shaped body 27 of glass by means of which light rays from the output face 23b of the first lens cluster 23 are directed to an input face 25a of the second lens cluster 25.

An input face 29 of the wedge-shaped body 27 is normal to the optical axis $O_1$ of the lens cluster 23. The body 27 has a wedge angle 31 of about 30° defined by faces 33 and 35 extending across the input face 25a of the second lens cluster 25. The face 35 of the body is closely adjacent to the input surface 25a of the lens cluster 25 and is normal to its optical axis $O_2$.

The optical projector 11 further includes a second CRT 37 and associated collimating optical system 39, the CRT 37 being positioned alongside the CRT 15 but producing on its screen a luminous display of a colour different from that produced by the CRT 15, e.g. in a narrow red light waveband. The active optical elements of the collimating system 39 comprise a third lens cluster 41 having an input surface 41a closely adjacent the screen of the CRT 37, and the already mentioned lens cluster 25 of the collimating system 17 associated with the CRT 15. The collimating optical system 39 further includes a reflector means in the form of a second wedge-shaped body 43 of glass by means of which light rays from the output face 41b of the third lens cluster 41 are directed to the input face 25a of the second lens cluster 25.

The wedge-shaped body 43, which is of identical shape to the body 27, has an input face 45, corresponding to the input face 29 of body 29, normal to the optical axis $O_3$ of the lens cluster 41, and two further faces 47 and 49 which define the wedge angle of the body 43. The face 47, which corresponds to the face 33 of the body 27 positioned in juxtaposition to the face 33, with a dichroic mirror coating 51 sandwiched between the faces 33 and 47, i.e. at the interface between the two bodies 27 and 43. The coating 51 is reflective to light produced at the screen of the CRT 15 and transmissive to light produced at the screen of the CRT 37.

The display head has a frame (not shown) fixed to the housing 19 and supporting the combiner arrangement 13 which in this particular example comprises two elements 53, 55 of conventional form in spaced apart parallel relationship, such a dual element arrangement serving to extend the field of view compared with a single element arrangement.

In operation, light rays from the screen of the CRT 15 pass through the first lens cluster 23 and enter the body 27 via the input face 29. Within the body 27 the light rays are reflected at the face 35 towards the face 33 where they are reflected by the dichroic coating 51 back to the face 35, the rays reflected from the coating 51 passing through the face 35 to the second lens cluster 25. After passing through the lens cluster 25 the light rays are reflected at the combiner arrangement 13 to provide an observer whose eyes are at a position 41 with a collimated image of luminous data presented on the screen of CRT 15 superimposed on his view through the combiner arrangement 13.

Light rays from the screen of the CRT 37 pass through the lens cluster 41 and enter the body 43 via the input face 45. Within the body 43 the light rays are reflected at the face 49 towards the second lens cluster 25 via the coating 51 and the body 27. After passing through the lens cluster 25 the light rays are reflected at the combiner 13, thus providing the observer with a collimated image of luminous data presented on the screen of CRT 37, in addition to the image of luminous data presented on the screen of CRT 15, as described above. The observer is thus provided with a two-colour head-up display.

As can readily be seen from the drawing, the length of the light path P1 from the screen of CRT 15 to the second lens cluster 25 is the same as the length of the light path P2 from the screen of the CRT 37 to the second lens cluster 25, as in required for satisfactory operation.

At least over the region of the face 35 of body 15 through which light rays from the CRTs 15 and 37 pass, reflection of rays from the first lens cluster 23 is by way of critical angle reflection. However, over the rest of the face 35 i.e. in the region nearer the input face 29 of the body 27, where light rays from the first lens cluster 23 may be incident at angles less than the critical angle for glass to air, the face 35 may be provided with a mirror coating to render it fully internally reflective.

At the face 49 reflection may either be by way of critical angle reflection or, if desired, a mirror coating may be provided on at least part of the face 49.

It will be understood that whilst equality of the lengths of the eight paths P1 and P2 is facilitated by the bodies 27 and 43 being of identical shape, the two bodies of light refractive material in a projector according to the invention are not necessarily of the same shape.

A particular merit of an optical projector according to the invention is that without reducing the total and instantaneous fields of view available to the observer its maximum dimension in the general direction of the optical axis of the second lens arrangement, i.e. its maximum lateral dimension, may be made smaller than in comparable known forms of optical projector wherein the reflector means are plane mirrors. Thus, as in the arrangement described by way of example, in a projector according to the invention the lateral dimensions of the projector may be dictated by the luminous data sources rather than the optical elements of the projector so that the maximum lateral dimension may be not substantially greater than the sum of the corresponding dimensions of the luminous data sources, thus providing an optical projector of slim lateral dimensions. It will be appreciated that this is of particular advantage, for example, in head-up display systems for use in high performance aircraft where space is at a premium.

We claim:

1. A head-up display head, comprising: a combiner arrangement through which an observer can view a scene; and an optical projector arranged to project light representing a display onto the combiner arrangement for reflection to the observer, thereby to provide the observer with a view of the display superimposed on his view of said scene through the combiner arrangement; said projector comprising: a first luminous data source; a first lens arrangement having an optical axis and arranged to receive light from said first source; a second lens arrangement having an optical axis at an angle to the optical axis of the first lens arrangement; between said first and second lens arrangements a first body of light refractive material having alight input face via which light enters said first body from said first source via said first lens arrangement, and two further faces which define a wedge-shaped portion of said first body extending across a light input surface of said second lens arrangement; a second luminous data source which produces light in a waveband different from that of said first source; a third lens arrangement arranged to receive light from said second source; a second body of light refractive material having a light input face via which light enters said second body from said second source via said third lens arrangement and two further faces which define a wedge-shaped portion of said second body; and a dichroic coating between an interface between one of said further faces of said first body and one of said further faces of said second body, said coating being reflective to light from said first source and transmissive to light from said second source; light from said first source following a first light path such that on entering said first body via said first lens arrangement it undergoes critical angle reflection at the other further face of said first body to said one further face of said first body from whence, after reflection at said coating, it is transmitted without substantial reflection, by said other further face of said first body to said second lens arrangement for transmission thereby onto said combiner arrangement; and light from said second source following a second light path such that on entering said second body via said third lens arrangement it is first reflected at the other further face of said second body from whence it is transmitted, via said coating, to said second lens arrangement for transmission thereby onto said combiner arrangement; the lengths of said first and second light paths being substantially the same.

2. A head-up display lead to claim 1 wherein said first and second bodies of light refractive material are of substantially identical shape with said interface being between corresponding faces of the two bodies.

3. A head-up display head according to claim 1 wherein light from said second source undergoes critical angle reflection at said other further face of said second body.

4. A head-up display head according to claim 1 wherein said other further face of said first body is provided with a mirror coating over a region where light rays first incident thereon from said first lens arrangement are at angles of incidence less than the critical angle of the material of said body.

5. A head-up-display head according to claim 2 wherein light from said second source undergoes critical angle reflection at said other further face of said second body.

* * * * *